United States Patent [19]

Csipkes et al.

[11] Patent Number: 5,862,250
[45] Date of Patent: Jan. 19, 1999

[54] SYSTEM AND METHOD FOR CONTACTLESSLY AND AUTOMATICALLY DETERMINING THE INSERTION LOSS OF AN OPTICAL FIBER CONNECTOR

[75] Inventors: Andrei Csipkes, Columbia, Md.; John Mark Palmquist, Lilburn, Ga.

[73] Assignee: Lucent Technologies Inc., Murray Hill, N.J.

[21] Appl. No.: 754,814

[22] Filed: Nov. 21, 1996

Related U.S. Application Data

[63] Continuation-in-part of Ser. No. 510,226, Aug. 2, 1995, Pat. No. 5,729,622.

[51] Int. Cl.$^6$ .............................. G06K 9/00; G02B 6/36
[52] U.S. Cl. ........................ 382/141; 356/73.1; 385/78; 385/137; 382/151
[58] Field of Search ................................ 382/141, 151, 382/152; 356/73.1, 345, 355–358, 363; 359/109, 110; 385/60, 78, 76, 67, 71, 59, 86, 136–137

[56] References Cited

U.S. PATENT DOCUMENTS

| 4,360,268 | 11/1982 | Zucker et al. | 356/73.1 |
| 4,738,507 | 4/1988 | Palmquist | 350/96.21 |
| 4,738,508 | 4/1988 | Palmquist | 350/96.21 |
| 4,787,698 | 11/1988 | Lyons et al. | 350/96.2 |
| 5,351,334 | 9/1994 | Chun et al. | 385/134 |
| 5,625,450 | 4/1997 | Ikeno | 356/73.1 |
| 5,671,049 | 9/1997 | Csipkes et al. | 356/358 |

OTHER PUBLICATIONS

"Checkmate F5 System Instruction Manual," Oyokoden Lab Co., Ltd. (at least as early as 1991).
"Norland Fiber Interferometer," Norland Products Inc., New Brunswick, NJ (1992).
"ZX–1 Zoom Interferometers," Direct Optical Research Company, Phoenix, AZ (at least as early as Jan. 1995).
"Topo–3D Quick Tour Manual," Wyko Corporation, Tucson, AZ., Ltd. (Feb. 1990).
Norland, Eric A., "Defining and Measuring Physical Parameters of PC Polished Connectors," The 10th Annual National Fiber Optic Engineers Conference, San Diego, CA, Jun. 12–16, 1994, pp. 259–265.
Harding, Kevin et al., "Light Engineering for Machine Vision: Techniques and Applications," Part 1 and Part 2, Mar. 2–3, 1994, Ann Arbor, Michigan, Manufacturing Engineering Certification Institute sponsored by SME.

*Primary Examiner*—Leo H. Boudreau
*Assistant Examiner*—Bhavesh Mehta

[57] ABSTRACT

An insertion loss determination system contactlessly and automatically determines an insertion loss of an optical fiber connector having a domed combination of an optical fiber and a surrounding support ferrule. The system is suitable for a fully automated connector assembly line. In structure, the system comprises (a) a core-to-ferrule eccentricity (CFE) inspection system configured to determine a CFE parameter corresponding with an offset between a fiber center and a ferrule center; (b) a fiber light intensity tester (FLIT) configured to determine a FLIT parameter corresponding with an amount of a reference light that fails to pass through the fiber; and (c) an insertion loss evaluation system configured to determine an insertion loss of the connector based upon the parameters. The evaluation system may further be configured to identify an insertion loss class, for example, very good, good, or bad, based upon the insertion loss.

21 Claims, 10 Drawing Sheets

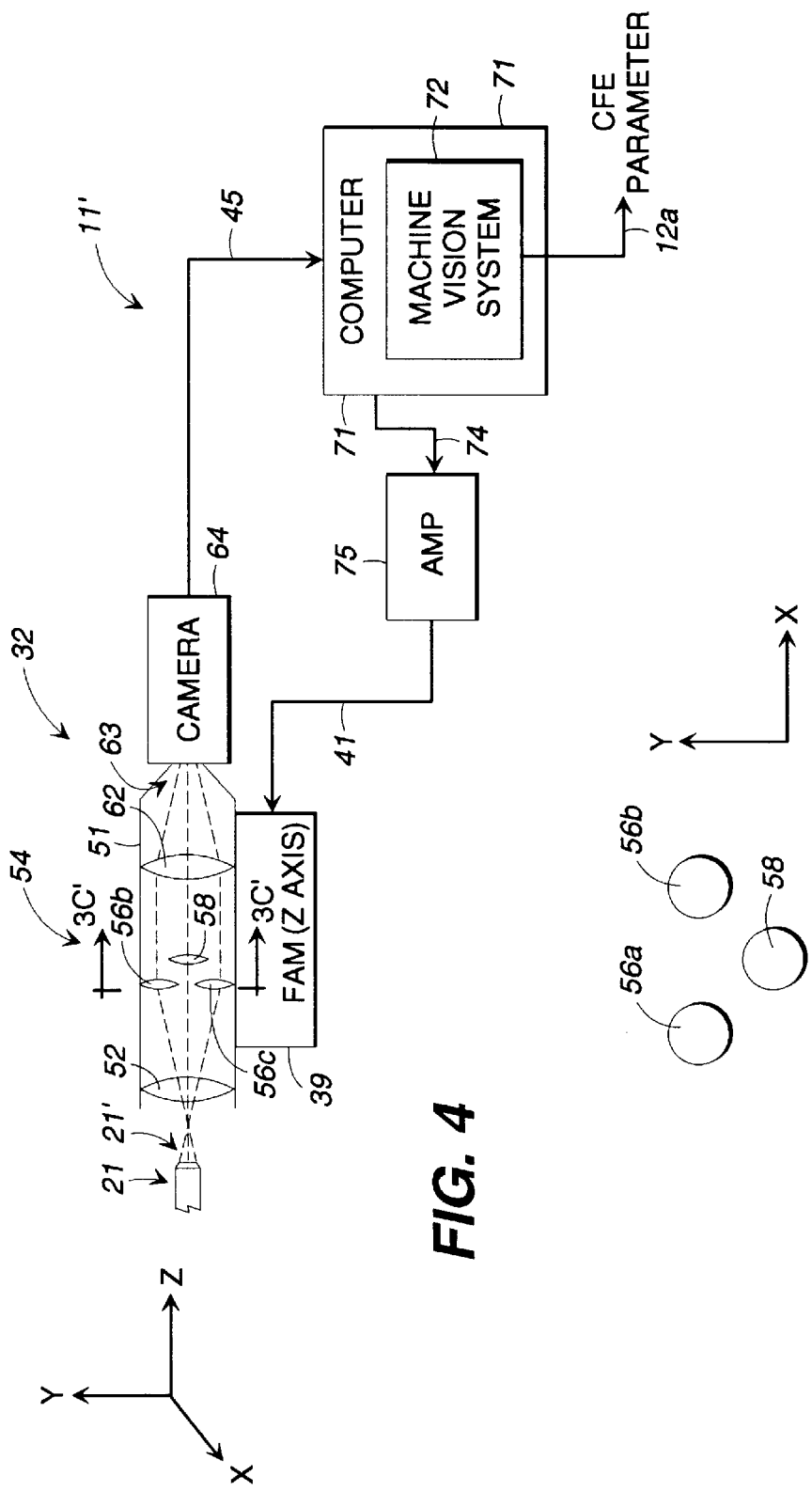

SYSTEM AND METHOD FOR CONTACTLESSLY AND AUTOMATICALLY DETERMINING THE INSERTION LOSS OF AN OPTICAL FIBER CONNECTOR

This document is a continuation-in-part (CIP) of commonly assigned U.S. patent application entitled "Automatic Inspection System For Contactlessly Measuring An Offset Of A Central Feature Of An Object," filed Aug. 2, 1995, by the inventors herein and assigned Ser. No. 08/510,226, U.S. Pat. No. 5,729,622, which application is incorporated herein by reference as if set forth in full hereinbelow.

FIELD OF THE INVENTION

The present invention generally relates to fiber optics and connectors and, more particularly, to a system and method for contactlessly and automatically determining insertion loss of an optical fiber connector having a domed optical fiber termination endface.

BACKGROUND OF THE INVENTION

Insertion loss is defined as the difference between the optical power launched into an interconnection cable and the optical power measured at the opposite end, or mathematically as follows: $L_i = -10 \log P_{out}/P_{in}$, where $L_i$ is the insertion loss, $P_{in}$ is the power of the optical signal launched into a cable, and $P_{out}$ is the power of the optical signal as it passes out of the cable. The geometric factors which influence insertion loss at a fiber-to-fiber interconnection include transverse offset, longitudinal offset, angular offset, index of refraction mismatch, mode field radius mismatch, the shape and finish of the fiber endface, and physical damage that may be present at the endface of the fiber in the connector.

Current methods of measuring insertion loss require that a reference jumper be identified and interconnected to the connector endface under test. The optical power exiting the reference end is measured and then compared with the optical power exiting the opposite end of the jumper under test. When taking the measurement, it is assumed that all of the loss is attributable to the jumper endface under test and none of the loss is attributable to the reference endface.

Although meritorious to an extent, this method is unsatisfactory in that variations in the reference endfaces often contributes to measurement error. Identification and maintenance of reference jumpers is a costly process, and the method itself is labor intensive. Furthermore, in order to automate measurement of insertion loss in a fully automated assembly line, automatic and contactless measurement is necessary. To date, no systems are known in the industry for contactlessly and automatically determining the insertion loss of an optical fiber connector.

SUMMARY OF THE INVENTION

The invention provides for an insertion loss determination system and method for contactlessly and automatically determining an insertion loss of an optical fiber connector having a domed combination of an optical fiber and a surrounding support ferrule. In structure, the system comprises: (a) a core-to-ferrule eccentricity (CFE) inspection system configured to determine a CFE parameter corresponding with an offset between a fiber center and a ferrule center; (b) a fiber light intensity tester (FLIT configured to determine a FLIT parameter corresponding with an amount of a reference light that fails to pass through the fiber; and (c) an insertion loss evaluation system configured to determine an insertion loss $L_i$ of the connector based upon the parameters.

The evaluation system may further be configured to identify an insertion loss class, for example, "very good," "good," "indeterminate" (i.e., cannot classify), or "bad," based upon the insertion loss $L_i$.

The invention can also be conceptualized as providing a method for contactlessly and automatically determining insertion loss of an optical fiber connector having a domed combination of an optical fiber and a surrounding support ferrule. The method can be broadly summarized as follows: (a) determining a core-to-ferrule eccentricity (CFE) parameter corresponding with an offset between a fiber center and a ferrule center; (b) determining a fiber light intensity parameter corresponding with an amount of a reference light that fails to pass through the fiber; and (c) determining an insertion loss of the connector based upon the parameters.

The invention has numerous advantages, a few of which are delineated hereafter, as examples.

An advantage of the invention is that insertion loss of an optical fiber connector can be accurately measured with repeatability and without dependence on the condition of a reference jumper, as in the prior art.

Another advantage of the invention is that it enables measurement of the insertion loss of an optical fiber connector without the expense associated with consuming expensive reference jumpers.

Another advantage of the invention is that it enables very fast measurement of the insertion loss of an optical fiber connector, making the invention appropriate for a fully automated assembly line.

Another advantage of the invention is that it provides for contactless measurement of insertion loss of an optical fiber connector.

Another advantage of the invention is that it provides for fully automatic measurement of the insertion loss of an optical fiber connector.

Another advantage of the invention is that it is particularly suited for, although not limited to, examination of ferrule type connector designs, because the effects of transverse offset, angular offset, index mismatch, mode field radius mismatch, and fiber endface geometry are assumed to be negligible in these types of connectors.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

FIG. 4 is a block diagram showing a possible specific implementation of the CFE inspection system of FIGS. 1 and 3;

FIG. 5 is a front view showing a lens configuration employed in the specific implementation of FIG. 4;

DETAILED DESCRIPTION OF THE PREFERRED EMBODIMENT

The following is a detailed description of the preferred embodiment of the invention. Many variations and modifications may be made to the preferred embodiment without departing substantially from the principles of the invention. All such modifications and variations are intended to be included within the scope of the present invention.

I. INSERTION LOSS DETERMINATION SYSTEM

Figure 1:
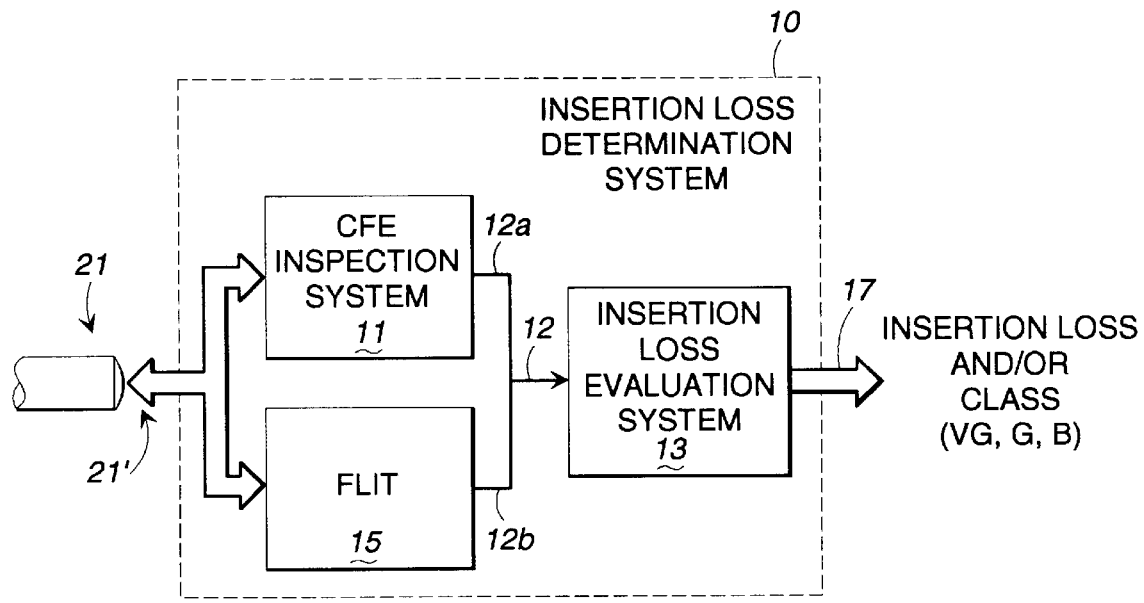
FIG. 1 is a block diagram showing the insertion loss determination system of the invention for generating an insertion loss and/or an insertion loss class.

The insertion loss determination system 10 and associated methodology of the invention is shown in FIG. 1. Generally, the insertion loss determination system 10 contactlessly and automatically determines the insertion loss of an optical fiber termination 21 that can be disposed in an optical fiber connector. Further, the system 10 can classify the insertion loss as, for example, very good, good, or bad.

In architecture, the insertion loss determination system 10 is constructed as follows. A core-ferrule-eccentricity (CFE) inspection system 11 automatically and contactlessly measures a CFE parameter 12a associated with the termination endface 21' of an optical fiber termination 21, as will be further described hereinafter. The CFE inspection system 11 forwards the CFE parameter 12a to an insertion loss evaluation system 13, as indicated by reference arrow 12. The construction and operation of the CFE inspection system 11 will be further described hereinafter with respect to FIGS. 3–5.

A fiber light intensity tester (FLIT) 15 automatically and contactlessly measures microbending losses, which are generally used to estimate the contribution to insertion loss caused by both microbending and surface imperfections in the polished end portion of the fiber core associated with the termination 21. The FLIT 15 produces a FLIT parameter 12b that is forwarded to the insertion loss evaluation system 13, as indicated by reference arrow 12. The construction and operation of the FLIT 15 will be further described hereinafter with respect to FIG. 9.

The insertion loss evaluation system 13, which is connected to the systems 11 and 15 for receiving respectively the CFE and FLIT parameters 12a, 12b is configured to assimilate these parameters and determine an insertion loss 17 based upon the assimilation of these parameters. In mathematical terms, insertion loss is defined as follows: $L=-10 \log P_{out}/P_{in}$, where L is the insertion loss, $P_{in}$ is the power of the optical signal launched into an optical fiber, and $P_{out}$ is the power of the optical signal as it passes out of the fiber. A typical maximum value for insertion loss is 0.5 decibels (dB).

In the preferred embodiment, the insertion loss 17 is used to classify the termination endface 21' as bad, good, or very good. If the insertion loss is greater than about 0.6 dB as determined by the system 10, then the termination 21 is concluded as "bad." If the insertion loss is between 0.4 and 0.6, then the insertion loss is considered "indefinite," as the uncertainty is high, and the measurement should be retaken and/or another type of insertion loss measurement should be employed. If the insertion loss is between 0.1 and 0.4 dB, then the termination endface 21' is classified as "good." Moreover, if the insertion loss is less than about 0.1 dB, then the termination endface 21' is deemed to be "very good." The foregoing information permits the user or an automated system to reject or accept the termination 21'.

It should be noted that the system and method of the invention is particularly suited to, although not limited to, examination of ferrule type connector designs, because the effects of transverse offset, angular offset, index mismatch, mode field radius mismatch, and fiber endface geometry are assumed to be negligible in these types of connectors.

II. CFE INSPECTION SYSTEM

A. OPTICAL FIBER TERMINATION AND MEASUREMENT OF THE CFE PARAMETER

Figure 2A:
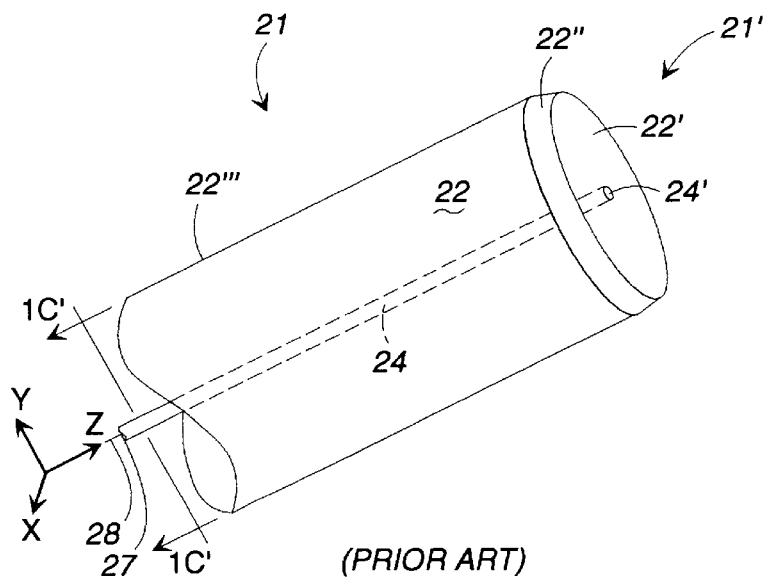
FIG. 2A is a perspective view showing a conventional ferrule type optical fiber termination.

FIG. 2A illustrates a ferrule termination 21. The ferrule termination 21 includes a generally-cylindrical outer support layer, or plug, 22 surrounding a generally cylindrical internal optical fiber 24. An endface 21' of the termination 21 includes a plug endface 22' situated about an optical fiber endface 24'. The endfaces 22', 24' collectively form a generally continuous spherical curvature (typically a radius of about 18 mm) that is transverse to the longitudinal z axis of the fiber 24. The termination endface 21' further comprises a beveled chamfer 22" situated between the plug endface 22' and a cylindrical outermost plug boundary surface 22''', which will be referred to as an alignment surface because it is engaged and guided by a coupling structure in a connection to insure alignment of separate terminations 21. The beveled chamfer 22" is generally conically annular about and symmetric with respect to the elongated optical fiber 24. Further, the alignment surface 22''' measures typically about 2500 microns in the ferrule termination 21 of the preferred embodiment.

The optical fiber 24 includes an outer elongated cladding layer 27 and an internal elongated cylindrical core 28 having a core endface 28', as illustrated in FIGS. 1B and 1C. The core generally measures approximately between 8 and 50 microns. Hence, the core is much smaller (typically between about 50 and 300 times for a ferrule termination and about 80 and 550 times for a biconic termination) than the alignment surface 22''' of the plug 22.

In a connection of two separate terminations 21, to enable optimal performance and minimize light energy losses and reflections, the termination endfaces 21' of the separate terminations 21 should be coupled so that the cores endfaces 28' of the respective endfaces 21' are precisely aligned. To achieve this end, the termination endfaces 21' are joined by a coupling structure 26, which engages and aligns respective alignment surfaces 22''' on the corresponding termination plugs. Usually, the coupling structure 26 comprises a generally cylindrical sleeve or equivalent thereof. An example of a coupling structure having the sleeve is described in U.S. Pat. No. 4,738,508 to Palmquist et al. In the case of a ferrule termination, the termination has an outer alignment surface 22''' of about 2500 microns in diameter that is aligned and guided by the coupling structure.

Figure 2B:
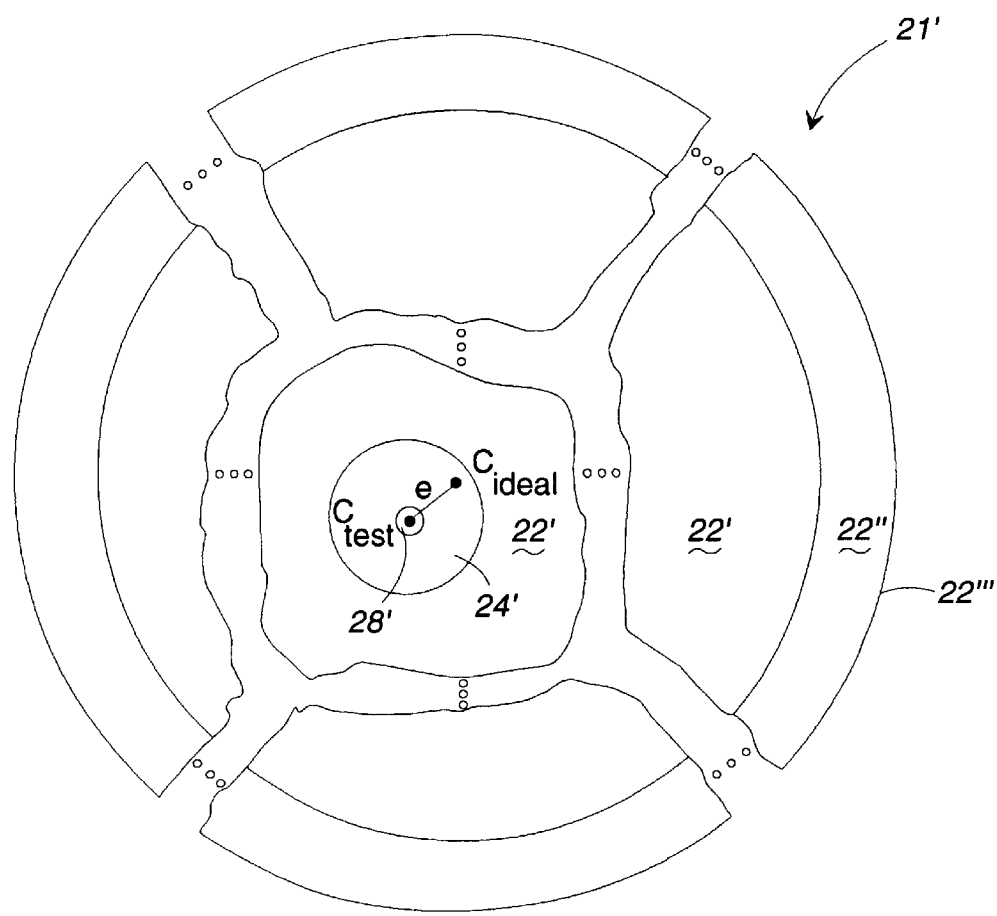
FIG. 2B is an endface view showing the termination of FIG. 2A.
Figure 2C:
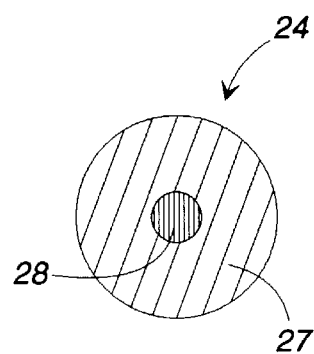
FIG. 2C is a cross-sectional view showing an optical fiber that is within the termination of FIG. 2A, which fiber includes a central optical fiber core and surrounding cladding.

In order to further insure proper alignment of the core endfaces 28' of terminations 21 in an optical fiber termination connection, the core endface 28' of each termination 21 should be disposed very close to the center of the termination endface 21'. The CFE parameter 12a of a termination is generally a measurement of the deviation of the core endface 28' from the center of the termination alignment surface. The concept of the CFE parameter 12a is more fully described hereafter in relation to FIG. 2B. For purposes of clarity and understanding, the CFE parameter 12a associated with the termination 21 is visually exaggerated. Herein, the CFE parameter 12a is defined as the deviation or displacement of the core endface 28' corresponding to the test termination 21 and having center $C_{test}$ from the theoretical ideal center $C_{ideal}$ of the endface area defined by the alignment surface 22'''. As described previously, the CFE parameter 12a of the core endface 28' relative to the alignment surface 22''' should not exceed a micron on each of two mating terminations 21 in order to achieve optimal performance. To achieve the foregoing precision, it is desirable to measure the CFE parameter 12a within a precision of about 0.1 micron.

It should be noted that the determination of CFE parameter 12a in the ferrule termination is slightly different than the determination of CFE parameter 12a in the biconic termination. More specifically, in a biconic termination, the alignment surface is the bevelled chamfer itself, which is a much larger region than the bevelled chamfer in the ferrule termination, and the boundary of interest for determining CFE parameter 12a is the boundary where the plug endface meets the bevelled chamfer. Moreover, the diameter of the foregoing boundary is typically about 4400 microns.

B. ARCHITECTURE

The CFE inspection system 11 can be any suitable system for measuring the CFE parameter 12a. Preferably, the system determines the CFE parameter 12a contactlessly and automatically.

As an example of a possible implementation, the CFE inspection system 11 may be implemented in accordance with the system and method described in U.S. Pat. No. 4,738,507 to Palmquist et al, the disclosure of which is incorporated herein by reference as if set forth in full hereinbelow. This system and method involves use of a V-shaped fixture for supporting a fiber endface and a machine vision system for imaging the endface. The fiber endface is placed in the fixture and then imaged. Next, the fiber is rotated along its alignment surface by 180 degrees and imaged once again. The difference between the core position in the first and second images is determined, and this difference represents the CFE parameter 12a.

Figure 3:
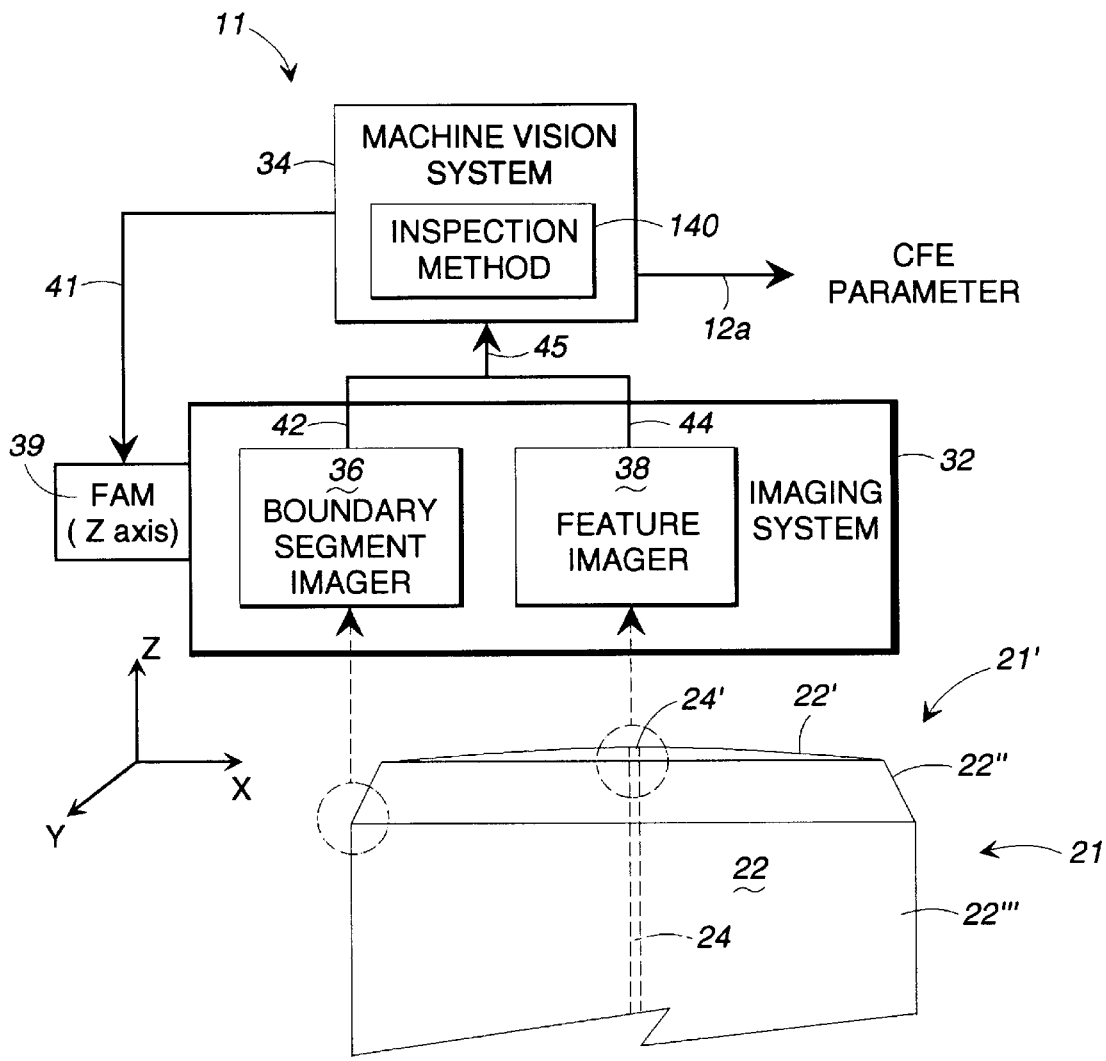
FIG. 3 is a block diagram showing the core-to-ferrule eccentricity (CFE) inspection system for generating the CFE parameter of FIG. 1.

Another example of a possible implementation of the system 11 is shown in FIG. 3. This implementation does not require rotation of the fiber, as did the last example. Referring to FIG. 3, the CFE inspection system 11 can be used to accurately determine the CFE parameter 12a (FIG. 1), which is essentially an offset of feature (e.g., fiber core) of an object (e.g., optical fiber termination) from the theoretical ideal center $C_{ideal}$ of the object without destruction of or contact with the object. It should be noted that the discussion hereafter relative to the CFE inspection system 11 is also applicable to the specific implementation (i.e., inspection system 11' of FIG. 4) of the CFE inspection system 11 that is described later in this document.

In architecture, the CFE inspection system 11 has an imaging system 32. The imaging system 32 has one or more boundary segment imagers 36 (preferably four spaced equidistant around the alignment surface 22'''; only one is shown in FIG. 3 for simplicity) and a feature imager 38. Each boundary segment imager 36 is configured to capture an image of a respective boundary segment of the alignment surface 22''', as indicated by phantom lines in FIG. 3. Moreover, the feature imager 38 is configured to capture an image of the feature at issue, which may exhibit an offset from the alignment surface 22'''. The imagers 36, 38 can be any suitable apparatus, conventional or custom made, for receiving an optical image as described and converting the optical image into an electrical signal for processing. Further, the imagers 36, 38 may share hardware, as will be further clear after the discussion of the specific implementations.

When the CFE inspection system 11 is utilized to image a ferrule termination endface 21', it is desirable to recess (by approximately 0.5 mm) the feature imager 38 slightly behind the boundary segment imager 36 from the termination endface 21' so as to accommodate for the difference in focal plane between the feature (termination core) and the boundary segment(s) on the termination endface 21'. This configuration enables optimal focusing of the termination endface 21' and more accurate determination of the CFE parameter 12a.

A machine vision system 34 is interconnected with the optical system 32 for processing the aforementioned image information and for producing the CFE parameter 12a. The machine vision system 34 can be any suitable logic, processor, or computer that is conventional or custom made and that is configured to process the electrical signals 42, 44 from the respective imagers 36, 38. In the preferred embodiment, the machine vision system 34 executes and is driven by an inspection method 140 (FIGS. 8A–8B), preferably in the form of an executable software program.

The imaging system 32 is interconnected with and is selectively moved by an automatic focus adjustment mechanism (FAM) 39, which in turn is controlled by the machine vision system 34 as indicated by reference arrow 41. The FAM 39 is interfaced with the optical system 32 so that the imagers 36, 38 can be moved, individually or collectively, to or from the respective areas to be imaged on the termination endface 21' so as to focus in the respective areas for precise imaging and for precise analysis by the machine vision system 34.

Depending upon the lighting conditions around the object under test, the object may need to be affirmatively illuminated with a light source. In the preferred embodiments, the optical fiber termination 21 is illuminated with any suitable light source so that images can be captured by the imagers 36, 38. Several lighting embodiments are described in commonly assigned U.S. patent application entitled "Automatic Inspection System For Contactlessly Measuring An Offset Of A Central Feature Of An Object," filed Aug. 2, 1995, by the inventors herein and assigned Ser. No. 08/510, 226.

The CFE inspection system 11 may be mounted in a commercial scale optical fiber manufacturing facility or other facility for monitoring the quality control of optical fiber terminations 21. Moreover, the termination 21 under test can be disposed in view of the imaging system 32 by manual human manipulation or, alternatively, by an automated mechanism. As an example, the termination 21 could be situated upon a conveyor, along with perhaps many other terminations 21 situated in series, and moved in front of the imaging system 32 so that a measurement can be automatically made by the CFE inspection system 11.

When the CFE inspection system 11 is in operation, the termination endface 21' is exposed to the boundary segment imager(s) 36 and the feature imager 38 of the imaging system 32. The boundary segment imager(s) 36 produces a boundary segment image that is representative of a boundary segment of the alignment surface 22'''. Moreover, the feature imager 38 generates a feature image that is representative of the feature of interest. As indicated by reference numerals 42, 44, 45 in FIG. 3, in the preferred embodiment, the images are combined into a single combined image, and an electrical signal indicative of the combined image is passed onto the machine vision system 34 for analysis. Alternatively, each of the imagers 36, 38 may generate a separate electrical signal representative of its respective area of interest, and the separate electrical signals are passed onto the machine vision system 34, where the electrical signals are used to construct the combined image in software or firmware for analysis.

From the combined image, the machine vision system 34 determines the CFE parameter 12a (offset, or eccentricity) of the feature relative to the alignment surface 22''' as follows. A curve (e.g., a circle of known diameter) is fitted to each boundary segment captured by each boundary segment imager 36. A termination endface center $T_{test}$ is mathematically identified based upon the one or more fitted curves. Generally, the more curves that are utilized, the more accurate will be the determination of the theoretical termination endface center $T_{test}$. In the preferred embodiment, there are four boundary segment imagers 36 and as a result, there are four circles fitted to the alignment surface 22'''. Moreover, the actual core endface center $C_{test}$ of the object under test is determined using any appropriate analysis of the combined image, for example but not limited to, gradient analysis.

The CFE parameter 12a is determined using one of two embodiments. In the first embodiment, an eccentricity vector e is determined by comparing a distance vector $d_{test}$ with a distance vector $d_{ideal}$. The distance vector $d_{test}$ represents the displacement between the core endface center $C_{test}$ and the termination endface center $T_{test}$, both corresponding with a test termination 21. The distance vector $d_{ideal}$ represents the displacement between an ideal core endface center $C_{ideal}$ and an ideal termination endface center $T_{ideal}$, both corresponding with an ideal termination 21 (i.e., characterized by de minimis eccentricity) and stored during initialization of the CFE inspection system 11. Further, a magnitude and angle for the eccentricity can be directly determined from the eccentricity vector e.

In the second embodiment (best mode), the CFE parameter 12a is determined first by drawing radial lines outwardly from the core endface center $C_{test}$ and positioning each fitted circle center on a respective radial line. Further, the intercept points where the radial lines intersect the fitted circles are identified and compared to ideal intercept points corresponding to an ideal termination endface center $T_{ideal}$. A transformation map (lookup table or equation) having the ideal intercept points is generated during initialization of the CFE inspection system 11, and the ideal intercept points are retrieved in operation based upon the core endface center $C_{test}$. Finally, the CFE parameter 12a is determined by comparing the ideal intercept points with the actual intercept points.

C. SPECIFIC IMPLEMENTATION

FIG. 4 illustrates the best mode for practicing the CFE inspection system 11 of FIG. 3. The best mode embodiment is generally denoted by reference numeral 11' in FIG. 4.

Structurally, the CFE inspection system 11' comprises an imaging system 32 having an elongated, preferably cylindrical, microscope 51 situated along a longitudinal z axis that is generally in line with the termination 21 (perpendicular to the termination endface 21'). The microscope 51 includes an objective 52 (one or more lenses or other optical elements) situated at a first end of the microscope 51 and adapted to capture images of the termination Structurally, the CFE inspection system 11' comprises an imaging system 32 having an elongated, preferably cylindrical, microscope 51 situated along a longitudinal z axis that is generally in line with the termination 21 (perpendicular to the termination endface 21'). The microscope 51 includes an objective 52 (one or more lenses or other optical elements) situated at a first end of the microscope 51 and adapted to capture images of the termination endface 21'. The microscope 51 further comprises an arrangement 54 of secondary lenses situated near the longitudinal midpoint of the microscope 51. The secondary lens arrangement 54 includes a boundary segment lens 56 situated near an internal periphery of the microscope 51 and a centrally-situated feature lens 58, which is disposed along the longitudinal axis of the microscope 51. The microscope 51 further includes a collector 62 (one or more lenses or other optical elements) positioned at a second end of the microscope 51 to receive images from the secondary lens arrangement 54 and to project a combined image through an opening 63 at the second end of the microscope 51. A "combined image" herein means a single image derived from the superimposition or combination of two or more other images via hardware, software, or combination thereof. The objective 52, the feature lens 58, and the collector 62 have their focal points positioned and substantially aligned along a common z axis, while the boundary segment lens 56 has its focal point positioned along another z axis that is parallel to the common z axis.

Because of the aforementioned lens arrangement in the microscope 51, the boundary segment appears inverted in the combined image, while the feature appears noninverted. In other words, the boundary segment image that is retrieved from the objective 52 is effectively folded inwardly toward the feature when the combined image is formed at the collector 62. Moreover, the feature image is received by the centrally-situated feature lens 58 from the objective 52 and passed in a noninverted state to the collector 62, so that the feature appears noninverted in the ultimate combined image.

In the preferred embodiment, the arrangement 54 has four boundary segment lenses 56a–56d in a satellite configuration situated substantially equidistant around the centrally-situated feature lens 58 and along the internal periphery of the microscope 51. FIG. 5 is a front view of a the lens configuration employed in the best mode. From FIG. 5, it is apparent that the boundary segment lenses 56a–56d are spaced about 90 degrees apart about the central feature lens 58. Hence, in the best mode, four boundary segment imagers and a feature imager are implemented. Furthermore, because the CFE inspection system 11 is utilized to image a ferrule termination endface 21', it is desirable to recess (by approximately 0.5 mm) the feature lens 58 slightly behind the plane of the boundary segment lenses 56a–56d from the termination endface 21' so as to accommodate for the difference in focal plane between the termination core endface 28' and the alignment surface 22''' on the termination endface 21'. This configuration enables optimal focusing of the termination endface 21' and more accurate determination of the CFE parameter 12a.

A camera 64 is connected to the second end of the microscope 51 and is positioned 1 5 to receive the combined image from the collector 62 through the opening 63. The camera 64 can be any suitable imaging device for converting an optical image into an electrical signal, but is preferably a charge-couple device (CCD), such as a model KP-M1, which is commercially available from Hitachi, Japan. The CCD camera 64 comprises a pixel array for receiving light. Moreover, the pixel array encodes the image by generating analog voltage signals proportional to the intensity of light at each pixel of the CCD, as is well known in the art.

Preferably, the FAM 39 is a model P721.00 piezoelectric translator, which is manufactured by Physik Instrumente, Germany. The foregoing piezoelectric translator can selectively move the microscope 51 a distance of about 100 microns (with a resolution of 3 about nanometers) based upon a closed loop control signal of voltage between about 0 and 100 volts. When 0 volts is supplied to the piezoelectric translator 72, the objective 52 is maintained at its greatest distance (is completely retracted) from its target along the z axis, whereas when 100 volts is supplied to the piezoelectric translator 72, the objective 52 is the closest distance (fill extension) to the target along the z axis.

The microscope 51 is mounted to the FAM 39. Under the control of the machine vision system 34 as indicated by reference arrow 41, the FAM 39 can move the microscope 51 along its longitudinal z axis so that the lens configuration within the microscope 51 is moved to or from the termination endface 21'. A suitable FAM 39 is a piezoelectric translator that can selectively move the microscope 51 a distance based upon a closed loop control signal of voltage.

The machine vision system 34 receives the analog electrical signals that encode the combined image from the CCD camera 64, as is indicated by the reference arrow 45. As mentioned, the machine vision system can be implemented with any suitable logic, processor, computer, or a combination thereof. In the preferred embodiment, the machine vision system 34 includes a general purpose computer 71, such as a model Globalyst 600 computer, which is commercially available from AT&T, U.S.A. The computer 71 is equipped with a machine vision system 72, for example but not limited to, a model ITI ITEX OFG (overlay frame grabber) image processing card that is commercially available from Microdisk, Inc., U.S.A.

An amplifier 75 is connected between the control line(s) of the computer 71 and the FAM 39. The amplifier 75 receives control signals, as delineated by reference arrow 74, from the computer 71, amplifies them, and provides amplified piezocontrol signals 41 within the voltage range of 0–100 volts to the piezoelectric FAM 39, as indicated by the reference arrow 41. A suitable amplifier is a model E860.10 amplifier manufactured by and commercially available from Physik Instrumente, Germany.

The combined images that can be captured and generated by the imaging system 32 of the CFE inspection system 11' will now be described. The combined images enable accurate computation of the offset of the object feature relative to the boundary of the object, and particularly, in the case of the termination 21, the CFE parameter 12a of the core endface 24' relative to the alignment surface 22''', despite the fact that the alignment surface 22''' is much larger than the core endface 24'. Indeed, the alignment surface 22''' typically measures about 2500 microns in a ferrule termination 21, whereas the core endface 24' measures between about 8 and about 50 microns.

Figure 6:
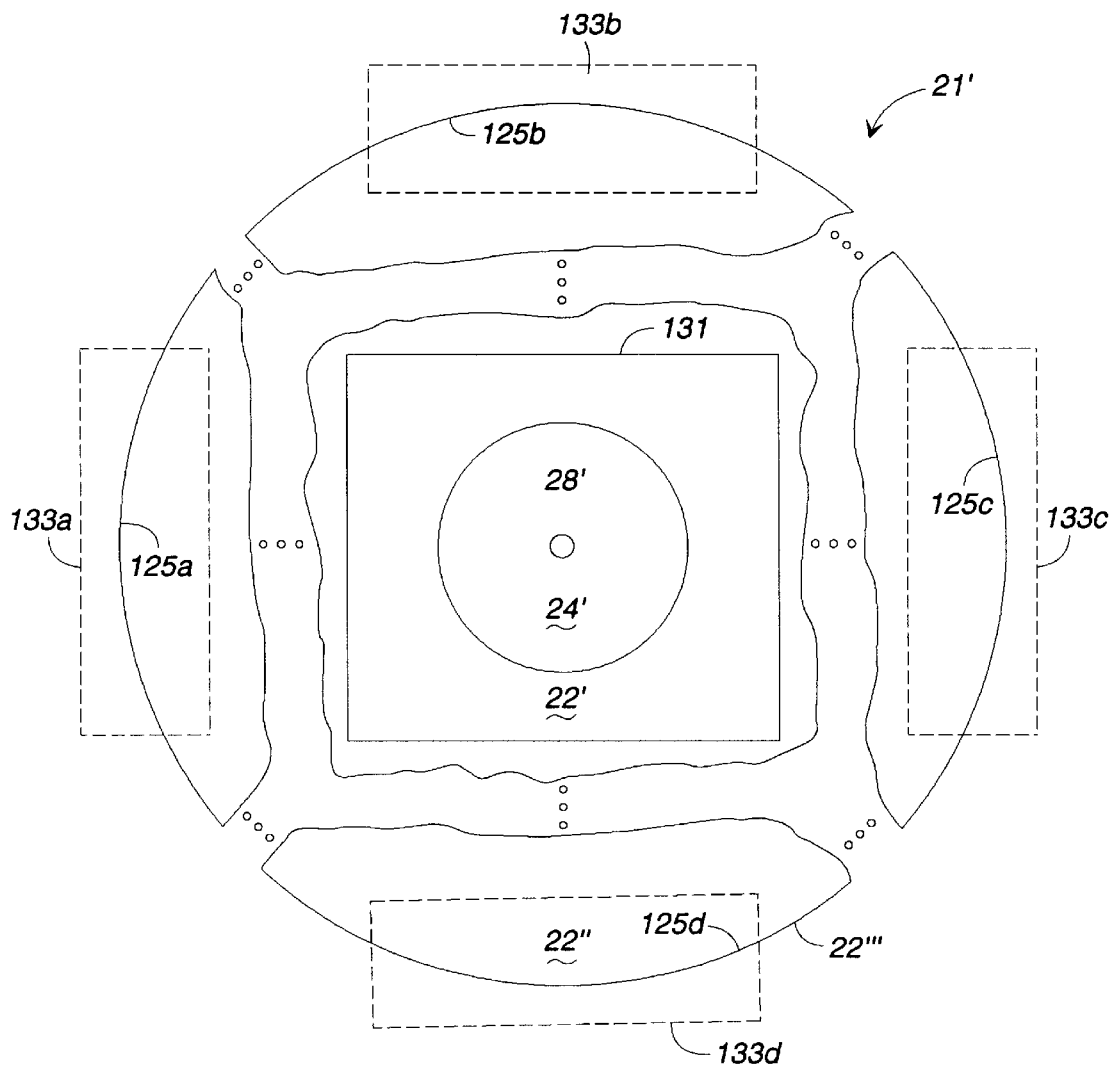
FIG. 6 is a schematic diagram showing the termination endface and the various separate regions that are imaged by the specific implementation of FIG. 4.

FIG. 6 schematically shows the termination endface 21' with an overlay of the feature image 131 that is captured by the feature imager 38 (FIG. 3). As shown, the feature image 131 is large enough to encompass the fiber endface 24' (both the core endface 28' and the cladding endface 27') and a portion of the surrounding plug endface 22', but is not sufficiently large enough to capture the entire termination endface 21' and, particularly, the alignment surface 22'''. The one or more boundary segments imagers 36 (FIG. 3 and 4) are configured to capture a respective boundary segment image 133a–133d that includes respective boundary segments 125a–125d. In the case when more than one boundary segment imager 36 is employed, the boundary segment imagers 36 should be positioned to capture boundary segment images 133 that are spaced symmetrically about the core endface 28'. In the preferred embodiments, four boundary segment imagers 36 are utilized, and they are configured to capture the boundary segment images 133a–133d, as shown in FIG. 6.

Figure 7:
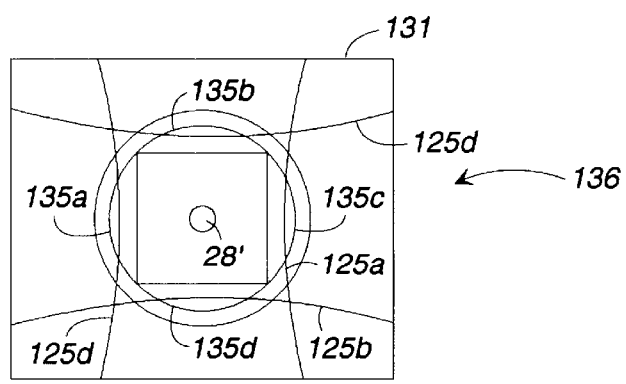
FIG. 7 is a schematic diagram showing a combined image that is produced by the lens configuration of FIG. 5 and that is derived from a core image and four inverted boundary segment images.

FIG. 7 shows the combined image 136 that is retrieved by the CFE inspection system 11' for determining the offset, or CFE parameter 12a. More specifically, FIG. 7 shows a combined image 136 derived from a core image 131 and four inverted boundary equally-spaced segment images 133a–133d.

D. INSPECTION METHODOLOGY

Figure 8A:
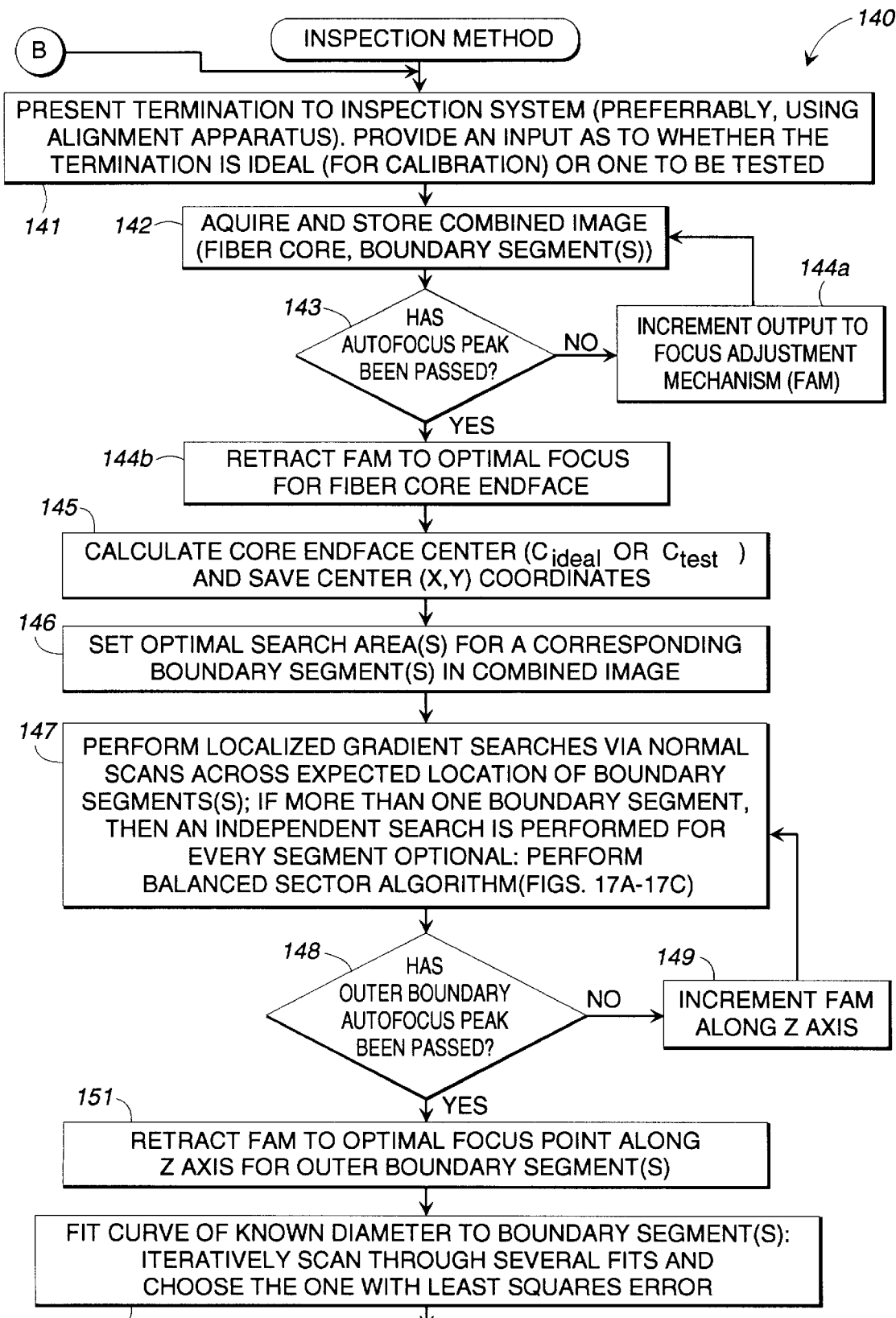
FIGS. 8A and 8B show a flow chart showing a CFE inspection method that is implemented by the CFE inspection system in FIGS. 1, 3, and 4.
Figure 8B:
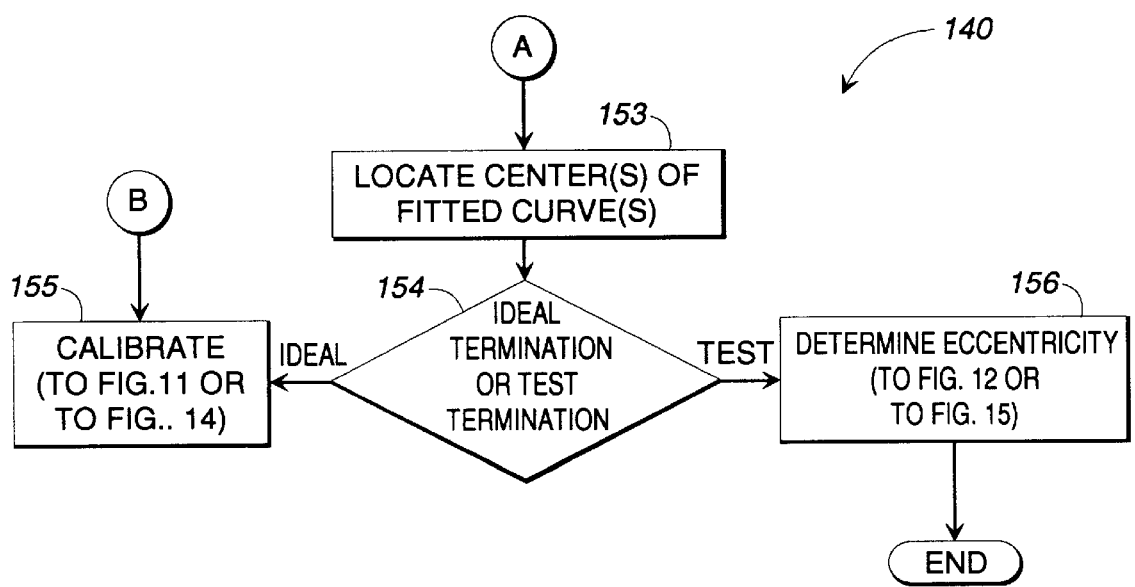

A CFE inspection method 140 for configuring and driving the machine vision system 34 (FIGS. 3 and 4) is set forth in FIGS. 8A and 8B. In essence, the CFE inspection method 140 causes the CFE inspection system 11, 11' (FIGS. 3 and 4) to focus the imagers 36, 38 on the object under test, analyze the captured combined image 136, and determine the CFE parameter 12a based upon the location of the boundary segment(s) 125 relative to the core endface 28' within the combined image 136.

Initially, as indicated in the flow chart block 141, the termination endface 21' is presented to the imaging system 32 of the CFE inspection system 11. If a ferrule termination is to be tested, then an alignment apparatus 110 is preferably utilized to align the termination endface 21'. An example of a suitable alignment apparatus is set forth in commonly assigned U.S. patent application entitled "Automatic Inspection System For Contactlessly Measuring An Offset Of A Central Feature Of An Object," filed Aug. 2, 1995, by the inventors herein and assigned Ser. No. 08/510,226.

An input is also provided to the CFE inspection system 11 by the user to indicate whether the termination endface 21' corresponds to an ideal termination 21 (i.e., a reference termination with substantially zero eccentricity) or a termination 21 to be tested. Obviously, the CFE inspection system 11 can be configured to assume a test termination, unless otherwise specified by the user. If an ideal termination endface 21' is present, then the algorithm 140 will perform a calibration routine, as will be described hereinafter.

Next, a combined image 136 is acquired and stored by the machine vision system 34, as denoted in the flow chart blocks 142, 143, 144a. In order to acquire the image with optimal focus, the FAM 39 is utilized to move the imagers 36, 38 relative to the termination endface 21' by increments, and after movement by each increment, the focus of the combined image is checked via gradient analysis. The gradient is the change, or difference in value, between a pixel value and the value of an adjacent pixel along a particular direction. Preferably, the FAM 39 is initialized so that the imagers 36, 38 are located the furthest distance away from the termination endface 21', and then the imagers 36, 38 are moved incrementally toward the termination endface 21', while monitoring gradient changes in the combined image 136.

After it is determined that the focus peak has been passed after movement by an increment, the FAM 39 is controlled to move the imagers 36, 38 back to the optimal focus position, as is indicated in the flow chart blocks 143, 144b.

The core endface center $C(x_0, y_0)$ (either $C_{ideal}$ or $C_{test}$) of the core endface 28' is calculated and the center x,y coordinates are saved, as denoted in flow chart block 145. The center $C(x_0, y_0)$ is identified using any appropriate analysis of the combined image 131, for example, gradient analysis. Furthermore, the coordinates x,y are based upon the image boundary of the combined image 131.

As delineated in the flow chart block 146, a search area 135 (FIG. 7) is defined in the combined image 131 for each of the boundary segments 125 that exist in the combined image 136. In the preferred embodiments, each search area 135 is a region having a circular side and a linear side and is disposed within the boundary of the fiber endface 24'. One reason that each search area 135 is confined to a region within the outer boundary of the fiber endface 24' is that this placement minimizes possible adverse effects resulting from noise that will exist around the fiber boundary. Moreover, in the best mode, there are four search areas 135a–135d that are defined equidistant about the image of the core endface 28' for the purpose of searching for each of four boundary segments 125a–125d, respectively.

Next, as indicated in the flow chart block 147, localized gradient searches are performed via normal scans across each search area 135 in order to identify the location of the boundary segment 125 within each search area 135. More specifically, lines that are transverse to the boundary segment 125 are scanned and analyzed by examining the changing gradient between adjacent pixel values. From the foregoing analysis, the location of the boundary segment 125 can be identified in each search area 135.

In order to ensure the integrity of the determination of the boundary segment location, the inspection method 140 ensures that the outer boundary segment(s) 125 are in optimal focus. In order to ensure optimal focus, the gradient searches are performed iteratively after the FAM 39 has been adjusted to move the imaging system 32 along the z axis, and after each adjustment by the FAM 39, the gradients for each search area 135 are summed and compared to a previous value in order to determine a peak value. Once a peak value has been identified by passing the peak value, the FAM 39 is caused to retract so that the optimal focus point is achieved for the outer boundary segments 125. The foregoing process is indicated in flow chart blocks 148–151.

As indicated in the flow chart block 152, a curve (e.g., circle, ellipse, etc.) is fitted in two dimensions (in x, y plane) to each boundary segment 125 by iteratively scanning through several fits and choosing the one with the least squares error. In the preferred embodiment, a circle of a known diameter (in the best mode, 2.5 mm) is fitted to each boundary segment.

After a curve has been fitted to each boundary segment 125, a determination is made as to whether the termination 21 is an ideal termination 21 or a test termination 21, as indicated in flow chart block 154. The ideal termination 21 is used for calibration of the CFE inspection system 11 and is basically a termination 21 with minimal eccentricity (as close to zero as possible), as determined by any other suitable process, such as any of those indicated in the background section of this document. The presence of an ideal termination is input to the machine vision system 34 by the user during initialization of the CFE inspection system 11, as indicated in the flow chart block 141.

If an ideal termination 21 is present, then the inspection method 140 performs a calibration method, as indicated in flow chart block 155 and then transfers back to flow chart block 141 and remains ready for analysis of a test termination 21, if desired. Alternatively, if at flow chart block 154 a test termination 21 is present, then the inspection method 140 determines the CFE parameter 12a using an eccentricity determination method, in accordance with flow chart block 156, and then the method 140 concludes. First and second embodiments for the calibration and eccentricity determination procedure are described hereafter.

III. FLIT

Figure 9:
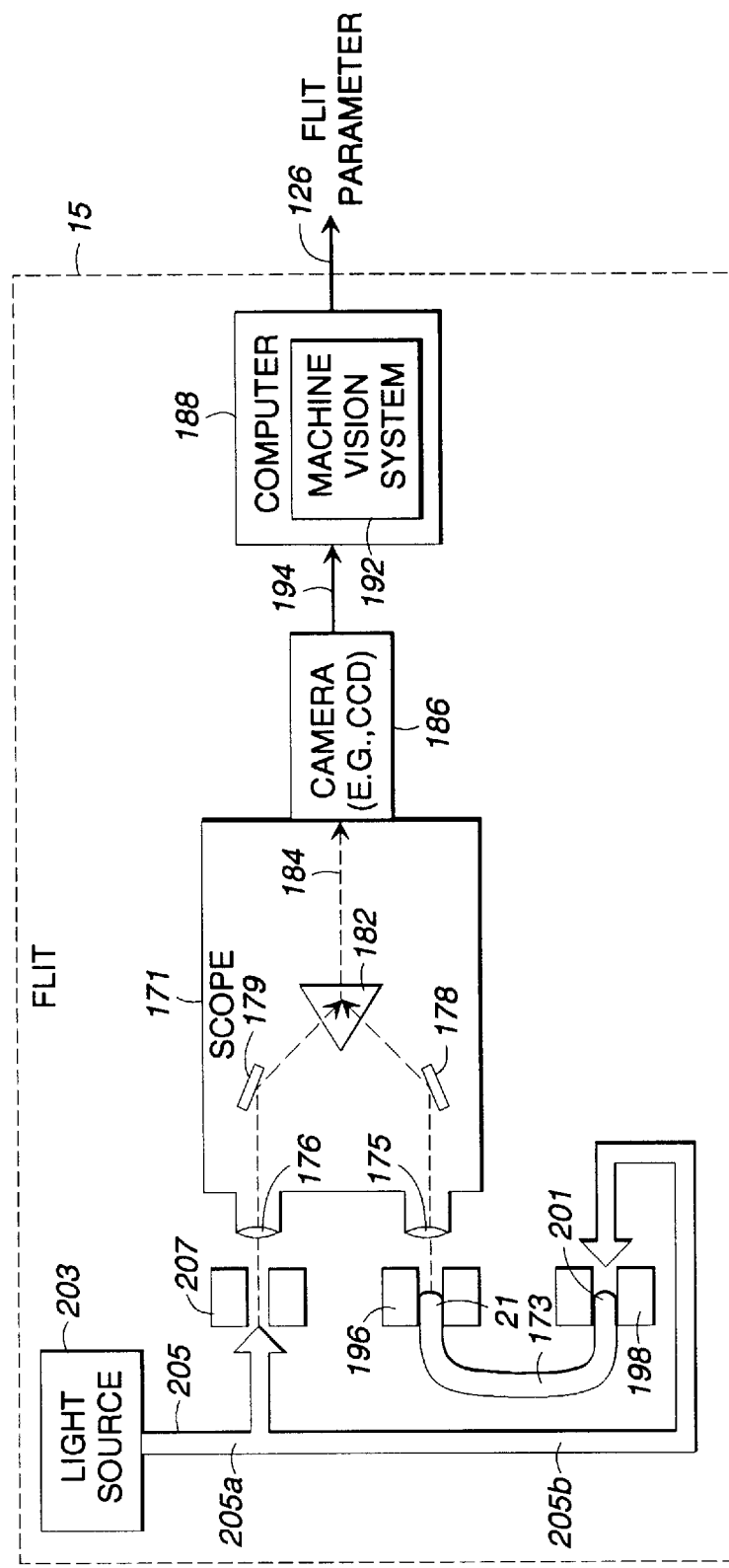
FIG. 9 is a block diagram showing the fiber light intensity tester (FLIT) for producing the FLIT parameter of FIG. 1.

A suitable embodiment of the flit 15 (FIG. 1) is shown in detail in FIG. 9. The flit 15 is used to measure the contribution to insertion loss caused by both microbending and surface imperfections in the polished end portion of the fiber core of the termination 21. With reference to FIG. 9, the flit 15 includes a scope 171 configured to examine the endface 21 of the connector 173. The scope 171 includes objectives 175, 176, which project light respectively to reflectors 178, 179. The reflectors 178, 179 project light from the respective objectives 175, 176 to a prism 182. The prism 182 receives the light from reflectors 178, 179, combines the light paths, and produces a collimated light signal 24 that is passed to a camera 186. The camera 186 can be any suitable device, for example, a charge-couple device (CCD).

A computer 188, which includes a machine vision system 192, is connected to the camera 186, as indicated by reference arrow 194, for receiving electrical signals indicative of the images captured by the camera 186. The computer 188, by utilizing the machine vision system 192, produces the flit parameter 12b (FIG. 1) for the insertion loss evaluation system 13 (FIG. 1).

Fixtures 196, 198 are disposed for receiving endfaces 21, 201 of the connector 173, respectively. The fixtures 196, 198 can be any suitable device for securing and/or aligning the endfaces 21, 201, respectively.

A light source 203 is provided for projecting light into the endface 201 of the connector 173 and into the objective 176 of the scope 171. In the preferred embodiment, the light source 203 channels light to the endface 201 and the objective 176 via a fiber bundle 205, which is split, as indicated by reference arrows 205a, 205b. The fiber bundle end 205a is connected to a fixture 207, which aligns the light emitted from the end 205a with the objective 176 of the scope 171. Furthermore, the fixture 198 aligns the end 205b of the fiber bundle 205 with the endface 201 of the connector 173 so that light passes from the light source 203 into the endface 201 and connector 173.

In operation, the connector 173 is initially engaged with the fixtures 196, 198. Light from the light source 203 is passed through fiber bundle 205a, into objective 176, and then into prism 182 via reflector 179. Light is also passed through the connector 173, into objective 175, and into prism 182 via reflector 178. The prism 182 combines light from the reference path as well as light exiting the connector 173 and passes the combined signal 184 to the camera 186. The camera 186 electronically encodes the optical signal and passes it to the machine vision system 192 of the computer 188 for analysis. The machine vision system 192 measures any deviation in the intensity of light exiting the endface 21 under test that is caused by microbending losses. Essentially, the machine vision system 192 compares the light levels of the reference light and the exiting light in order to derive a light level difference, which is indicative of the microbending losses.

The light level difference is converted to a flit parameter 12b by averaging the gray scale values (e.g., 0 to 255 for each pixel in an image) of the light pattern (image) associated with the fiber bundle reference and using the average value to scale the average of the gray scale values of the light pattern (image) associated with the fiber endface under test. As an example, consider the following hypothetical scenario. Assume that the fiber bundle gray scale average is normalized to a value of 100 at the time when the system is calibrated. A corresponding test jumper with negligible insertion loss is measured and found to have a gray scale pixel average of 135. Later, during a test measurement, assume that the fiber bundle gray scale average value drops to 98 from 100, and the FLIT value is recorded as 130. The FLIT value is scaled linearly as follows: 100/98 * 130= 132.6.

IV. INSERTION LOSS EVALUATION SYSTEM

Figure 10:
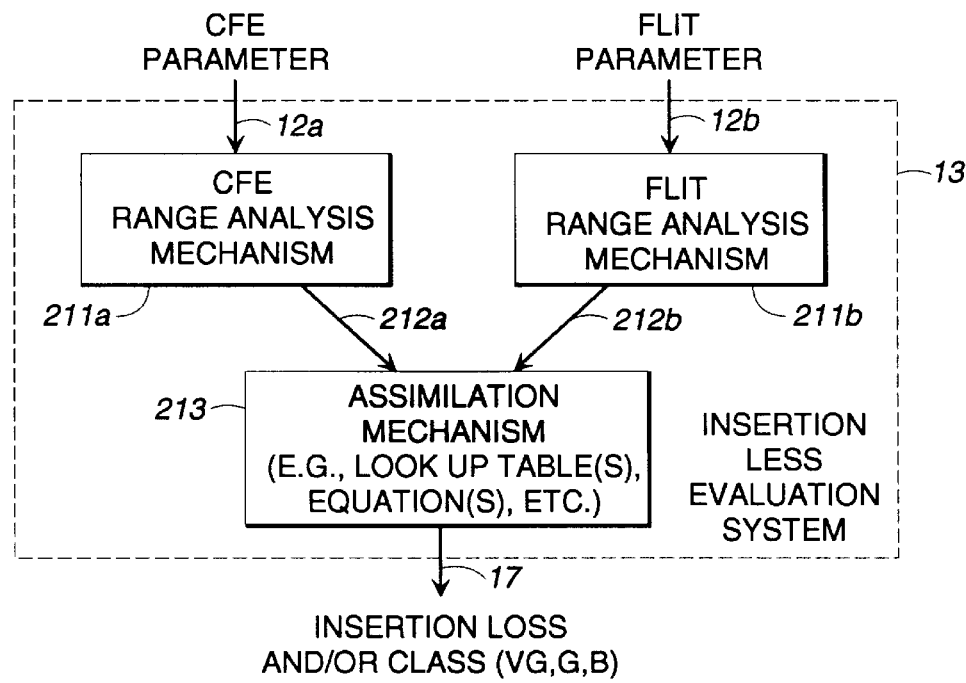
FIG. 10 is a block diagram showing the insertion loss evaluation system of FIG. 1.

A suitable embodiment for the insertion loss evaluation system 13 (FIG. 1) is described hereafter with reference to the block diagram in FIG. 10. The insertion loss evaluation system 13 includes a CFE range analysis mechanism 211a, a flit range analysis mechanism 211b, and an assimilation mechanism 213. Preferably, the aforementioned components are implemented in software in a suitable computer. However, hardware embodiments and embodiments derived from combinations of software and hardware are possible. These components are described in further detail hereafter.

When implemented in software, the insertion loss evaluation system 13 may be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

The CFE range analysis mechanism 211a is configured to receive the CFE parameter 12a and determine whether the CFE parameter 12a falls within a predefined CFE range. The CFE range analysis mechanism 211a essentially acts as an initial test mechanism to ensure that the CFE parameter 12a is not at an extreme value. The CFR range analysis mechanism indicates an acceptable insertion loss when the CFE parameter 12a falls outside the predefined CFE range. When it is outside of the range, the mechanism 211a advises the assimilation mechanism 213 to output an insertion loss class of "bad." If the CFE parameter 12a falls within the predefined CFE range, then the CFE range analysis mechanism 211a forwards the CFE parameter 12a to the assimilation mechanism 213, as indicated by reference numeral 212a. In the preferred embodiment, the acceptable range of the CFE parameter is between 0.0 and 1.2 microns for a single mode connector.

The flit range analysis mechanism 211b is configured to receive the flit parameter 12b and determine whether the flit parameter 12b falls within a predefined flit range. The flit range analysis mechanism 211b essentially acts as an initial test mechanism to ensure that the flit parameter 12b is not at an extreme value. The flit range analysis mechanism 211b indicates an acceptable insertion loss when the flit parameter 12b falls outside the predefined flit range. When it is outside of the range, the mechanism 211b advises the assimilation mechanism 213 to output an insertion loss class of "bad." If the flit parameter 12b falls within the predefined flit range, then the flit range analysis mechanism 211b forwards the flit parameter 12b to the assimilation mechanism 213, as indicated by reference arrow 212b. In the preferred embodiment, the acceptable range is essentially any value that is greater than 120, where the fiber bundle value is normalized to 100.

The assimilation mechanism 213 receives the parameters 12a, 12b, analyzes and assimilates them, and produces an insertion loss and/or class, as indicated by reference arrow 17. To analyze the parameters 12a, 12b, the assimilation mechanism 213 may employ a lookup table(s), an equation (s), etc. In the preferred embodiment, an equation is utilized to determine the insertion loss $L_i$, as follows:

$$L_i = 4e^{-\left(\frac{(CFE)^2}{18.9 \times 10^{-12}}\right)} \text{ when the } FLIT > 120$$
$$= 0.5 dB, \text{ when the } FLIT \leq 120$$

In the above equation, a single mode fiber with a core diameter of approximately 9 microns is assumed. The equation for the insertion loss $L_i$ when the FLIT parameter is less than 120 was determined based upon an analysis set forth in S. Nemoto and T. Makimoto, "Analysis of Splice Loss in Single-Mode Fibers Using a Gaussian Field Approximation," Optical and Quantum Electronics, vol. 11, p. 447 (1979), which is incorporated herein by reference. The assignment of the value 0.5 dB to $L_i$ when the FLIT<120 is intended to force an off line measurement of insertion loss by a conventional transmission measurement method because microbending losses are apparent from the low value of the FLIT parameter 12b.

Figure 11:
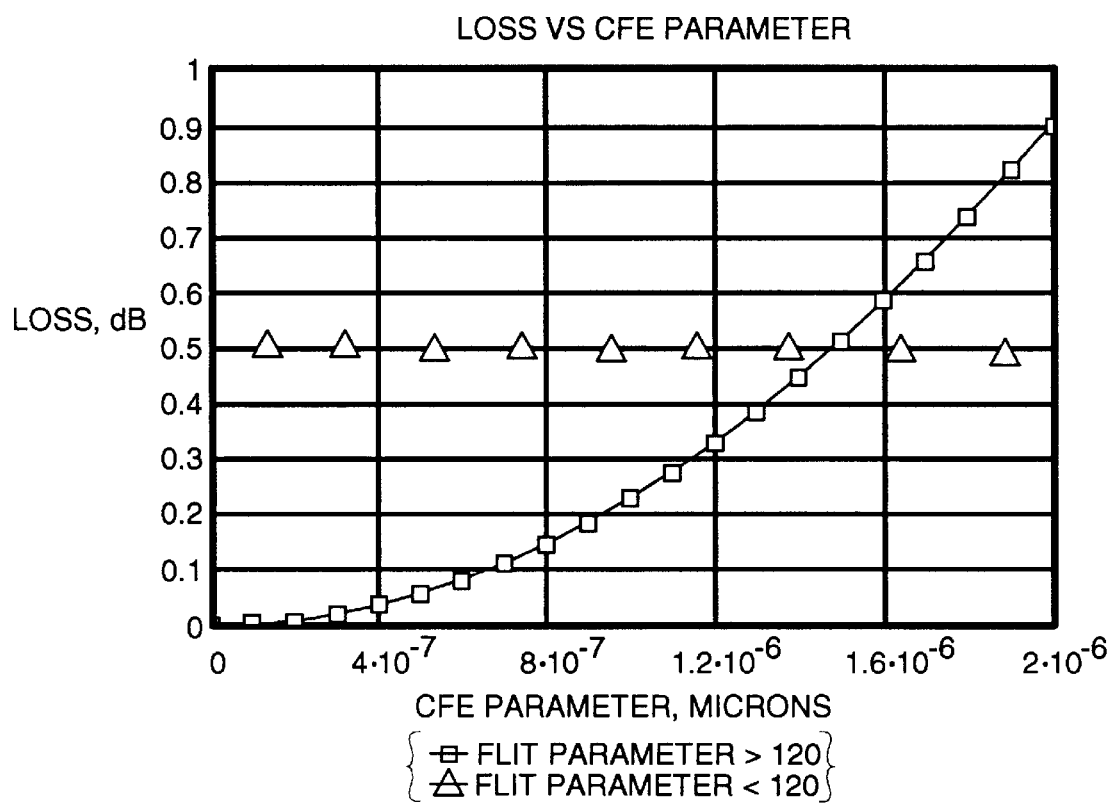
FIG. 11 is a graph of insertion loss versus the CFE parameter and the FLIT parameter, which graph shows the methodology employed by the evaluation system of FIG. 10.

FIG. 11 is a graph of the insertion loss $L_i$ versus the CFE parameter 12a and the FLIT parameter 12b, in accordance with the above equation.

Based upon the insertion loss, the assimilation mechanism 213 can be configured, if desired, to determine a class 17 indicative of whether the connector is satisfactory. In the preferred embodiment, if the insertion loss is greater than 0.6 dB, then the termination endface 21' is classified as "bad." If the insertion loss is between 0.4 dB and 0.6 dB, then the endface 21' should not be classified automatically and resort should be had to manual testing with a reference jumper. If the insertion loss is between 0.1 dB and 0.4 dB, then the endface 21' is classified as "good." Finally, if the insertion loss is less than 0.1 dB, then the endface 21' should be classified as "very good." The latter connector may be used as a reference, if desired. The assimilation mechanism 213 can output the class and/or the insertion loss to a user or an automatic system, such as a computer.

A first experiment demonstrates the capability of the CFE inspection system 11 to measure the CFE parameter 12a and predict resulting insertion loss. In this experiment, six conventional SC connectors were assembled and measured using the CFE inspection system 11.

The magnitude of the CFE parameter 12a varied from a low of about 0.2 microns to a high of about 2.23 microns. The resulting insertion loss against a reference connector was then measured. The measured data is set forth in Table B below. Generally, Table A illustrates the strong correlation between the measured CFE parameter 12a and the measured insertion loss using conventional reference components.

TABLE A

| Connector | CFE Parameter (Microns) | Insertion Loss |
| --- | --- | --- |
| 1 | 0.2 | 0.035 |
| 2 | 0.2 | 0.028 |
| 3 | 0.96 | 0.15 |
| 4 | 1.18 | 0.12 |
| 5 | 2.11 | 1.69 |
| 6 | 2.23 | 1.53 |

Figure 12:
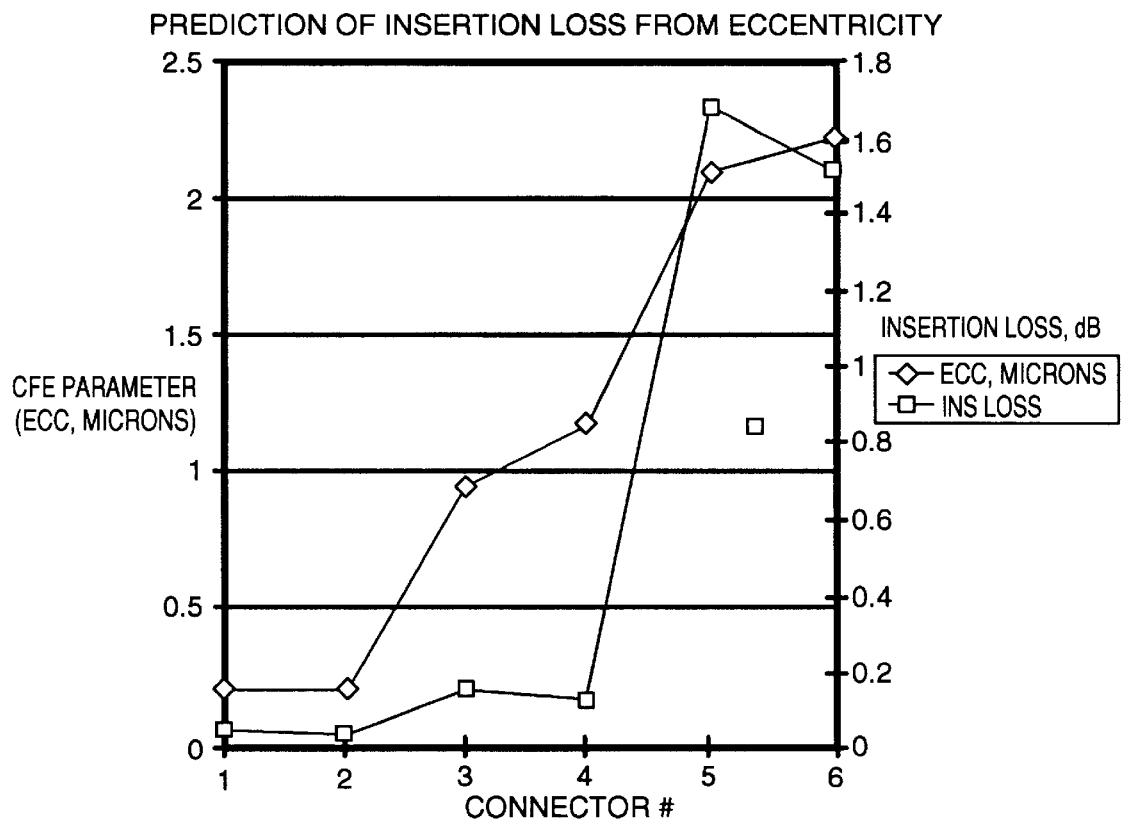
FIG. 12 is a graph of insertion loss and CFE parameter versus connector, which graph shows a strong correlation between CFE parameter and insertion loss.

FIG. 12 is a graph of insertion loss and CFE parameter versus connector. This graph shows the high correlation between the insertion loss and the CFE parameter 12a.

The capability of the flit 15 to predict microbending losses is demonstrated by another experiment. A jumper cable with negligible loss was measured by a conventional insertion loss set. Then, microbending losses were introduced by wrapping the fiber cable around a ¼" diameter mandrel. The increase in insertion loss was measured for increasing numbers of mandrel wraps. The same experiment was performed using the flit 15 to measure the sum of intensities of the pixels of white light in an image of the fiber core acquired by the machine vision system 192. The results of the experiment are revealed in the following Table B:

TABLE B

| Mandrel Wraps | Insertion Loss | Flit Intensity Sum | Flit Intensity Average |
| --- | --- | --- | --- |
| 0 | 0.000 | 1270269 | 134.75 |
| 1 | 0.016 | 1106795 | 117.41 |
| 2 | 0.022 | 1096455 | 116.31 |
| 3 | 0.037 | 1088800 | 115.50 |
| 4 | 0.052 | 1082731 | 114.85 |
| 5 | 0.064 | 1078537 | 114.41 |
| 6 | 0.073 | 1073528 | 114.11 |
| 7 | 0.083 | 1073721 | 113.92 |
| 8 | 0.089 | 1071319 | 113.71 |
| 9 | 0.110 | 1069991 | 113.49 |
| 10 | 0.123 | 1067685 | 113.26 |
| 11 | 0.132 | 1059662 | 113.00 |
| 12 | 0.141 | 1058699 | 112.88 |
| 13 | 0.148 | 1058451 | 112.67 |
| 14 | 0.156 | 1057111 | 112.49 |

The data set forth in Table B clearly demonstrates the capability of the flit 15 to detect microbending losses that contribute as little as 0.016 dB additional loss and as much as 0.15 dB additional loss. Inasmuch as the loss limit allowable for a single interconnection is typically less than 0.5 dB, the flit 15 operates in a range where detection of microbending losses is very useful.

Figure 13:
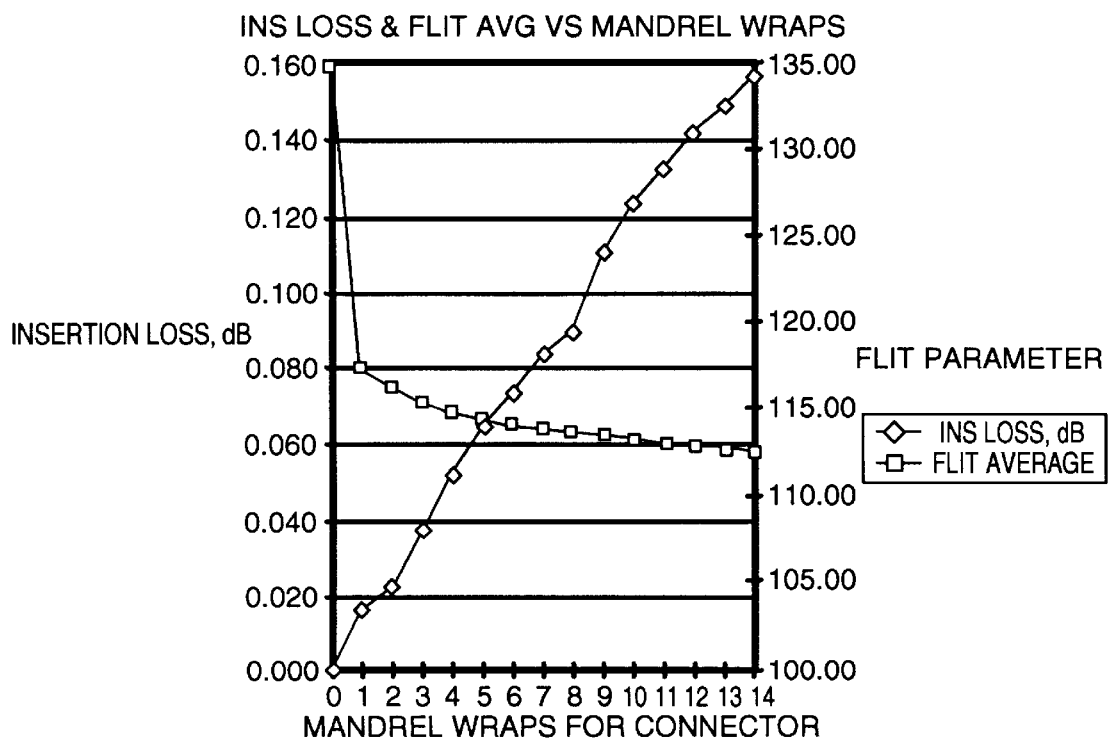
FIG. 13 is a graph of insertion loss and FLIT average versus mandrel wraps, which graph shows a strong correlation between FLIT parameter and the insertion loss.

FIG. 13 is a graph of insertion loss and flit parameter 12b versus mandrel wraps. This graph shows the strong correlation between insertion loss and the flit parameter 12b.

In the claims set forth hereinafter, the structures, materials, acts, and equivalents of all "means" elements and "logic" elements are intended to include any structures, materials, or acts for performing the functions specified in connection with said elements.

Wherefore, the following is claimed:

1. A method for contactlessly and automatically determining insertion loss of an optical fiber connector having a domed combination of an optical fiber and a surrounding support ferrule, the method comprising the steps of:
   (a) determining a core-to-ferrule eccentricity (CFE) parameter corresponding with an offset between a fiber center and a ferrule center;
   (b) determining a fiber light intensity (FLIT) parameter corresponding with an amount of a reference light that fails to pass through said fiber; and
   (c) determining an insertion loss of said connector based upon said parameters.

2. The method of claim 1, further comprising a means for identifying an insertion loss class based upon said insertion loss, said class indicating one of four ranges, a first range representing said insertion loss of less than 0.1 decibels, a second range representing said insertion loss of between 0.1 and 0.4 decibels, a third range representing said insertion loss of between 0.4 and 0.6 decibels, and a fourth range representing said insertion loss of greater than 0.6 decibels.

3. The method of claim 1, wherein step (a) comprises the steps of:
   (1) imaging a fiber periphery of said fiber and a portion of said ferrule from a vantage point that is substantially axial to said fiber;
   (2) determining a fiber center from said fiber periphery;
   (3) determining a ferrule center from said ferrule portion; and
   (4) determining said CFE parameter based upon said fiber center and said ferrule center.

4. The method of claim 1, wherein step (b) comprises the steps of:
   (1) passing said reference light through said connector at one end of an optical fiber cable and through another connector disposed at another end of said cable to derive modified reference light; and
   (2) combining said modified reference light from said another connector with said reference light to determine said amount of said reference light that fails to pass through said connector.

5. The method of claim 1, wherein step (c) comprises the steps of:
   determining whether each of said parameters falls within a respective predefined range;
   indicating an unacceptable insertion loss when one of said parameters falls outside its respective predefined range; and
   combining said parameters when all of said parameters fall within their respective predefined ranges to identify said insertion loss.

6. The method of claim 5, further comprising the step of using one or more lookup tables in said combining step to identify said insertion loss.

7. The method of claim 5, further comprising the step of using one or more equations in said combining step to identify said insertion loss.

8. A method for contactlessly and automatically determining an insertion loss of an optical fiber connector having a domed combination of an optical fiber and a surrounding support ferrule, the method comprising the steps of:
   (a) determining a core-to-ferrule eccentricity parameter by:
      (1) imaging a fiber periphery and a portion of said ferrule from a vantage point that is substantially axial to said fiber;

(2) determining a fiber center from said fiber periphery;

(3) determining a ferrule center from said ferrule portion; and (4) determining said core-to-ferrule eccentricity based upon said fiber center and said ferrule center;

(b) determining a fiber light intensity parameter by:

(1) passing said reference light through said connector at one end of an optical fiber cable and through another connector disposed at another end of said cable to derive modified reference light; and (2) combining said modified reference light from said another connector with said reference light to determine said amount of said reference light that fails to pass through said connector; and (c) determining an insertion loss based upon said parameters.

9. The method of claim 8, further comprising the step of identifying an insertion loss class based upon said insertion loss, said class indicating one of three ranges, a first range representing said insertion loss of less than 0.1 decibels, a second range representing said insertion loss of between 0.1 and 0.4 decibels, a third range representing said insertion loss of between 0.4 and 0.6 decibels, and a fourth range representing said insertion loss of greater than 0.6 decibels.

10. A system for contactlessly and automatically determining an insertion loss of an optical fiber connector having a domed combination of an optical fiber and a surrounding support ferrule, the system comprising:

(a) a core-to-ferrule eccentricity (CFE) inspection system configured to determine a CFE parameter corresponding with an offset between a fiber center and a ferrule center;

(b) a fiber light intensity tester (FLIT) configured to determine a FLIT parameter corresponding with an amount of a reference light that fails to pass through said fiber; and (c) an insertion loss evaluation system configured to determine an insertion loss of said connector based upon said parameters.

11. The system of claim 10, further comprising a means for identifying an insertion loss class based upon said insertion loss, said class indicating one of three ranges, a first range representing said insertion loss of less than 0.1 decibels, a second range representing said insertion loss of between 0.1 and 0.4 decibels, a third range representing said insertion loss of between 0.4 and 0.6 decibels, and a fourth range representing said insertion loss of greater than 0.6 decibels.

12. The system of claim 10, wherein said CFE inspection system comprises:

an imaging system including a fiber core imager and a boundary segment imager, said fiber core imager configured to capture a fiber core image of a fiber core, said boundary segment imager configured to capture a boundary segment image of a boundary segment of said ferrule; and a machine vision system interfaced with said imaging system and configured to determine said CFE parameter based upon said fiber core image and said boundary segment image.

13. The system of claim 10, wherein said FLIT comprises:

(1) a reference light source providing first and second light channels, said first light channel being passed through an optical fiber cable having said connector at one end and another connector at another end;

(2) a scope having:

(i) first and second objectives configured to receive said first and second light channels respectively; and (ii) a mechanism for combining light paths from said objectives to produce a combined light path;

(3) a camera associated with said scope for receiving said combined light path to produce an electrical signal;

(4) a machine vision system configured to receive said electrical signal, to determine said amount of said reference light that fails to pass through said fiber from said signal, and to determine said FLIT parameter from said amount.

14. The system of claim 10, wherein said insertion loss evaluation mechanism comprises:

(1) a CFE analysis mechanism for determining whether said CFE parameter falls within a predefined CFE range, said CFE analysis mechanism for indicating an unacceptable insertion loss when said CFE parameter falls outside said predefined CFE range;

(2) a FLIT analysis mechanism for determining whether said FLIT parameter falls within a predefined FLIT range, said FLIT analysis mechanism for indicating an unacceptable insertion loss when said FLIT parameter falls outside said predefined FLIT range;

(3) an assimilation mechanism configured to combine said parameters when all of said parameters fall within said ranges to identify said insertion loss.

15. The system of claim 12, wherein said imaging system comprises:

a fiber core lens configured to capture said fiber core image of said fiber core;

a boundary segment lens configured to capture said boundary segment image of said boundary segment; and a camera situated relative to said lenses to receive said fiber core image and said boundary segment image and configured to create a combined image therefrom.

16. The system of claim 14, wherein said assimilation mechanism is implemented with one or more lookup tables.

17. The system of claim 14, wherein said assimilation mechanism is implemented with one or more equations.

18. A computer readable medium having a computer program, said program comprising:

means for receiving a core-to-ferrule eccentricity (CFE) parameter corresponding with an offset between a fiber center and a ferrule center of an optical fiber connector;

means for receiving a fiber light intensity parameter corresponding with an amount of a reference light that fails to pass through said fiber; and means for determining an insertion loss of said connector based upon said parameters.

19. The medium of claim 18, further comprising:

(1) a CFE analysis mechanism for determining whether said CFE parameter falls within a predefined CFE range, said CFE analysis mechanism for indicating an unacceptable insertion loss when said CFE parameter falls outside said predefined CFE range;

(2) a FLIT analysis mechanism for determining whether said FLIT parameter falls within a predefined FLIT range, said FLIT analysis mechanism for indicating an unacceptable insertion loss when said FLIT parameter falls outside said predefined FLIT range;

(3) an assimilation mechanism configured to combine said parameters when all of said parameters fall within said ranges to identify said insertion loss.

20. The medium of claim 19, wherein said assimilation mechanism is implemented with one or more lookup tables.

21. The medium of claim 19, wherein said assimilation mechanism is implemented with one or more equations.

* * * * *